United States Patent [19]
Iana et al.

[11] Patent Number: 5,122,272
[45] Date of Patent: Jun. 16, 1992

[54] DRINKING WATER SUPPLY CONTAINER HAVING A REMOVABLY MOUNTED FILTER DEVICE

[75] Inventors: E. Charles Iana, 24 Bellevue Ave., Winchester, Mass. 01890; Michael R. McCray, Little Elm, Tex.

[73] Assignee: E. Charles Iana, Winchester, Mass.

[21] Appl. No.: 636,181

[22] Filed: Dec. 12, 1990

Related U.S. Application Data

[63] Continuation-in-part of Ser. No. 609,523, Nov. 5, 1990.

[51] Int. Cl.⁵ .............................................. B01D 24/00
[52] U.S. Cl. ................................. 210/473; 210/244; 210/282; 210/416.3; 210/446; 210/477; 222/189
[58] Field of Search ............... 210/282, 473, 477, 459, 210/446, 455, 264, 416.3, 472, 441, 436, 244; 215/229, 11.5; 222/189

[56] References Cited

U.S. PATENT DOCUMENTS 4,714,550  12/1987  Malson et al. .................... 210/244
4,800,018   1/1989  Moser ............................... 210/472

Primary Examiner—Robert A. Dawson
Assistant Examiner—Sun Uk Kim
Attorney, Agent, or Firm—Irving M. Kriegsman; Edward M. Kriegsman

[57] ABSTRACT

A container assembly for holding a supply of drinking liquid includes a watertight container. A removable filter device extends into the container through an opening at the top. The filter device comprises an elongated cylindrical member having an inner wall divides the area inside of an upper chamber and a lower chamber and forms a sipping tube for accessing the lower chamber through the upper chamber water filter is disposed in the lower chamber. In using the container, air is drawn in through the upper chamber and drinking liquid is drawn out through the sipping straw by suction.

2 Claims, 1 Drawing Sheet

DRINKING WATER SUPPLY CONTAINER HAVING A REMOVABLY MOUNTED FILTER DEVICE

CROSS REFERENCE TO RELATED APPLICATIONS

This invention is a continuation-in-part of U.S. Ser. No. 609,523 entitled Canteen Having a Removably Mounted Filter Device filed on Nov. 5, 1990 in the names of E. Charles Iana and Michael R. McCray.

BACKGROUND OF THE INVENTION

The present invention relates to drinking water supply containers and more particularly to a drinking water supply container having a removably mounted filter device for filtering water extracted from the canteen.

The term "drinking water supply container" as used herein refers to a bottle or a canteen or any other container for holding a drinking liquid which has an opening which can be sealed off with a removable cap.

In U.S. Pat. No. 4,852,781 there is disclosed a runner's portable water supply which comprises a water bottle with a special cap and sipping tube. The sipping tube is curved and only slightly flexible so that it can be bent, but retains its shape if the wearer does not bend it. The cap fits into the bottle neck in a liquid tight coupling and has a first interior surface slidably mating with the tube in a substantially liquid tight coupling and has a second interior tunnel permitting gas to enter the bottle but deflecting liquid so that liquid cannot splash out of the bottle. The bottle is coupled to a selected part of the wear's body with the upper end of the tube near the wearer's mouth and the lower end of the tube near the bottom interior surface of the bottle. Air flows into the bottle as liquid is sipped out. The bottle need not be held.

In U.S. Pat. No. 4,714,550 there is disclosed a water purifying system which includes an elongate chambered purifying assembly sized to be detachably mounted in a conventional canteen. The assembly is provided with an internal chamber filled with a particulate water purifying material and concentric tubes within the chamber require water flowing into the chamber through a filtered inlet at the bottom of the assembly to flow an extended chambered flow path through the purifying material to an outlet at the top of the assembly. The assembly includes a manually operable pump for presurizing said container, thereby pumping water from the canteen through the purifying assembly.

In U.S. Pat. No. 4,443,336 there is disclosed a portable filter unit comprising an outer flexible container including top, an upper compartment of flexible material enclosed in the container, a lower compartment of flexible material enclosed in the container, a tube communicating between the lower compartment and the upper end of the container and including an upper end and a lower end, a rigid filter means mounted in the container intermediate the compartment, and a filter means including a pair of separate filter units, one communicating between the upper and lower compartments and the other between the lower compartment and the lower end of said tube, respectively.

In U.S. Pat. No. 4,491,520 there is disclosed a filter for a conventional water jug having a valved tap near the bottom of its cylindrical side wall comprises a pan-like case member that seats in the bottom of the jug and has a filter cartridge removably sealed across its open top. An aperture in the axially short cylindrical side wall of the case member communicates its interior with the inwardly projecting tubular tap inlet. A radially projecting tubular collar on the case member cooperates with an O-ring to provide a seal between the interior of the case member and the tap inlet. A tacky, water-insoluble adhesive area on the underside of the bottom wall of the case member secures it to the bottom wall of a jug. The filter cartridge can comprise blow molded shell halves, filter paper dics, and activated charcoal confined between the discs.

In U.S. Pat. No. 4,298,475 there is disclosed a portable water purifier comprising an elongated tube having a filtering agent, a bactericidal agent and an absorbent material retained in the tube. The user supplies suction from the mouth to draw water through the tube for filtering out foreign material and purifying the water prior to use.

In U.S. Pat. No. 4,090,650 a canteen is provided with a drinking straw extending through the top of the screw cap of the canteen. The straw may be pushed substantially completely into the canteen when the straw is not used or it may be withdrawn from the canteen to a substantial length such that one may drink from the canteen without removing it, for example, from a belt. The screw cap and canteen neck are provided with cooperating elements which pinch the straw closed in the closed position of the cap.

In U.S. Pat. No. 3,731,717 there is disclosed an improved protective mask means having a drinking and resuscitation connection means to permit drinking and resuscitation while wearing the mask in a contaminated atmosphere.

In U.S. Pat. No. 3,389,803 there is disclosed an orally operable water filter comprising a housing having a mouthpiece on one end and a retaining cap on the other end all enclosing a pair of filter plates spaced from each other between which activiated carbon is disposed, and also comprising a bacteria filter in an end opposite the mouth piece end; said bacteria filter being protected by a pair of screens disposed on opposite sides thereof.

In U.S. Pat. No. 2,738,105 there is disclosed a canteen comprising a canteen case having an apertured portion, a cap releasably mounted on said apertured portion, a suction drinking tube affixed to an extending generally coaxially with said cap into the interior of said canteen case, a filtering element comprising a plurality of disks mounted on an apertured tube, said apertured tube having its upper end extending into an annular opening in the bottom of said cap and engaging an annular flange of said cap, means releasably secured to the lower end of said drinking tube for pressing said filtering element into engagement with said cap, a pressure equalizing tube extending into said case, and a check valve on said pressure equalizing tube preventing flow of liquid from said case to said equalizing tube.

It is an object of this invention to provide a filter device for use with a drinking water supply container.

It is another object of this invention to provide a drinking water supply container assembly which includes a filter device for removing contaminants which might be present in the water contained therein and wherein the liquid is extracted through the filter device by suction.

It is yet still another object of this invention to provide a new and improved filter device for use in canteens, sports bottles and other containers for holding drinking water and which does not include any pumping mechanism to assist in extracting the water.

It is a further object of this invention to provide a drinking water supply container assembly which includes a filter device having no moving parts and which does not have to be held by the user to extract water from inside the container.

SUMMARY OF THE INVENTION

A drinking water supply container assembly constructed according to the teachings of the present invention comprises a container for holding water and a filter device. The filter device extends into the container and comprises an elongated tubular member constructed so as to provide an upper chamber and a lower chamber. The upper chamber serves as a passageway for air entering the container while the lower chamber includes a water filter for filtering the water exiting the container. In using the container, water disposed inside the container is extracted through the water filter by suction and is replaced by air which enters the container through the upper chamber.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
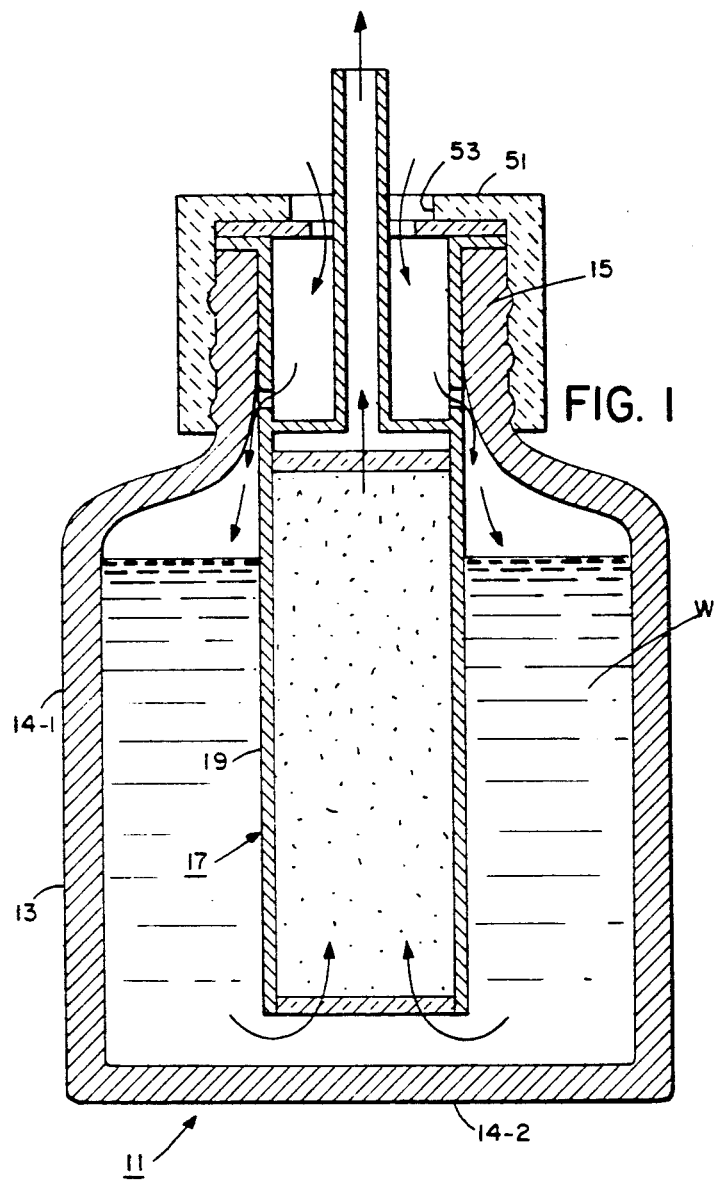
FIG. 1 is a cross-sectional view of a container assembly constructed according to the teachings of the present invention.

Referring now to the drawings, there is shown in FIG. 1 a cross-sectional view of a container assembly constructed according to the teachings of the present invention, the container assembly being identified by reference numeral 11.

Container assembly 11 comprises a container 13 for holding a liquid, such as water. Container 13 has a sidewall 14-1, a bottom wall 14-2 and an externally threaded neck 15. Container 13 made be made of either a soft walled material such as a deformable plastic or a hard walled material such as aluminum. An example of a container made of a soft walled material is a sports bottle (i.e. a bottle made of deformable plastic used by athletes) and examples of a container made of a hard walled material is a canteen or a glass bottle.

A filter device 17 is removably mounted in container 13. Filter device 17 serves to filter the liquid exiting container 13 and also provides a passageway for air entering the container.

Filter device 17 is tubular shaped and includes an elongated housing 19 shaped to have an open top, an open bottom, an outer wall 21 and an inner wall 23. Outer wall 21 is substantially cylindrically shaped. The outside cross-sectional diameter of device 17 is sized such that it may be inserted into or withdrawn from container 13 through neck 15. A radially outwardly projecting flange 24 extends around the periphery of outer wall 21 at its upper end 25 and rests on the upper end of neck 15. The length of housing 19 is such that when flange 24 rests on neck 15, the lower end 27 of housing 19 is closely adjacent the bottom 29 of container 13. Inner wall 23 is shaped to define a generally annular shaped base portion 31 and an elongated tubular portion 33. The elongated tubular portion extends up from base portion 33 beyond flange 24. Inner wall 23 serves to divide the area inside the outer wall 21 into an upper chamber 35 and a lower chamber 37. In addition, upper tubular portion 33 serves as a drinking or sipping tube through which water may be extracted from inside of container 13. Housing 19 is made of a suitable rigid durable material such as polypropylene. By way of example, for a container about $7\frac{1}{4}$ inches high, filter device 17 has an inside diameter d of about 0.750 inches and an overall length 1 of about 7.00 inches. The upper chamber 35 has a length 2 of about 1.00 inch and lower chamber has a length 3 of about 6 inches.

A plurality of outlet ports 40 are formed in outer wall 21 above base portion 31 to allow air entering chamber 35 from the top to exit.

A quantity of filter media 41 is disposed in lower chamber 37.

For a filter device 17 dimensional as set forth above, the dry set bed length of filter media 41 is at least 5.25 inches so that the ratio of the dry set bed length to the inside diameter is at least 7 to 1. Increasing the bed length will increase the efficiency of the filter but decrease the water flow.

Filter media 41 serves to filter the water as will hereinafter be explained and may be, for example, silver impregnated grannular activated carbon or a mixture of D.I. with GAC. The particle size of the filter media is preferably about 12 by 30, that is, the length and width dimensions of the particles are not greater than 0.0012 inches wide by 0.0030 inches long.

Filter media 41 is held in place inside housing 19 by upper and lower screens 43 and 45 which are disc shaped. Upper screen 43 is press fit into place and also serves as the outlet for lower chamber 37. Lower screen 45 is ultrasonically welded in place and also serves as the inlet to lower chamber 37. Screens 43 and 45 are each made of polypropylene or other suitable material.

Figure 3:
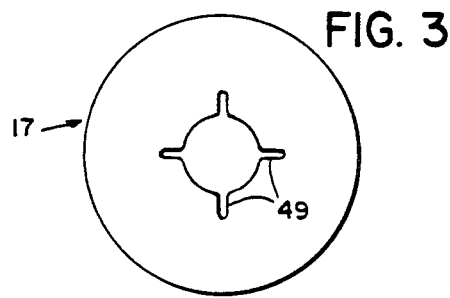
FIG. 3 is a plan view of the cover plate in the filter device in FIG. 2.
Figure 2:
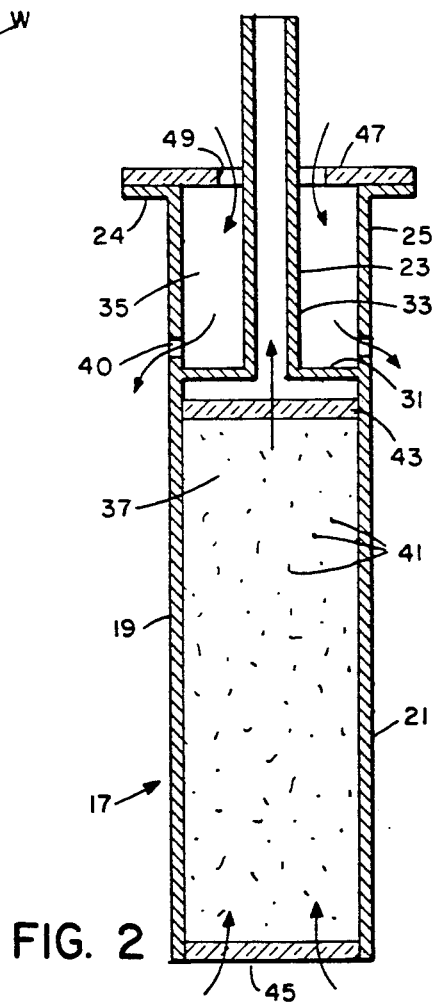
FIG. 2 is a cross section view of the filter device in the container shown in FIG. 1.

An annular shaped cover 47 also made of a suitable material such as polypropylene is fixedly attached to flange 23 by ultrasonic welding or other suitable means. Cover 47 includes a plurality of slit notches 49 (see FIG. 3) which serve as vent holes to allow air to get into upper chamber 35.

A removable cap 51 is threadably received on neck 15 of container 13. Cap 51 includes a central opening 53 which is larger in cross sectional size than tube 39 for receiving air from outside of canteen 11.

Container 11 is filled with water W by unscrewing cap 51, lifting out filter device 17 and then pouring the water in through neck 15.

In use, water W is dispensed from inside of container 13 by applying suction to the top end of tube 33. This causes water W to enter lower chamber 37 through screen 47, pass through filter media 41 and then exit through tube 33. At the same time this causes air to enter container 13, passing through opening 53 in cap 51, then through slit notches 49 in cover 47 into upper chamber 35 and then out through outlet ports 40 in housing wall 13. As can be appreciated, container 13 need not be held by the user and is not tipped to extract water W.

In another embodiment of the invention the cover plate is eliminated.

It is to be understood that various modifications can be made and that the invention is limited only by the claims.

For example, instead of being separate parts, cover 47 and cap 51 could be a unitary structure, either fixedly attached or not attached to flange 24.

Also, other materials which serve as filter media and which could be employed include any combination of the following compounds: exchange resins such as Purlite A.600 or A.400 etc., Aldex-C. 800. F, KDF, Manganese green sand, Nitra-Out and Notim; all such compounds being used in combination with grannular activated carbon or impregnated grannular activated carbon.

Also, filter media may be provided in chamber 35, if desired to filter the air entering container 13.

What is claimed is:

1. A container assembly for a drinking fluid comprising:

a. a watertight container having a neck at its upper end and an annular shaped cap removably mounted on said neck and
   b. a filter device extending into said container through said neck for providing a passageway for air entering said container and for filtering drinking fluid exiting said container, said filter device including a housing having an elongated tubular shaped outer wall and an inner wall, said inner wall being shaped to divide said filter device into an upper chamber and a lower chamber, a quantity of filter media disposed in said lower chamber, upper and lower disc shaped screens at the top and bottom, respectively, of said lower chamber for holding the quantity of filter media in said lower chamber, said drinking fluid entering said lower chamber through said lower screen and exiting said lower chamber through said upper screen, said inner wall being shaped to define a sipping tube extending down through said upper chamber to said lower chamber for enabling drinking fluid in said container to be extracted therefrom by suction, the flow path of the lower chamber being about equal to the length of the lower chamber, the dry set bed length of the quantity of filter media being less than the length of the filter device and being at least about 7 times the inside diameter of the lower chamber.

2. The container assembly of claim 1 and wherein said filter comprises a quantity of silver impregnated grannular activated carbon.

* * * * *